W. PAULI.
POWER TRANSMISSION FOR TRACTORS.
APPLICATION FILED MAR. 3, 1919, RENEWED NOV. 8, 1920.
1,371,930.   Patented Mar. 15, 1921.
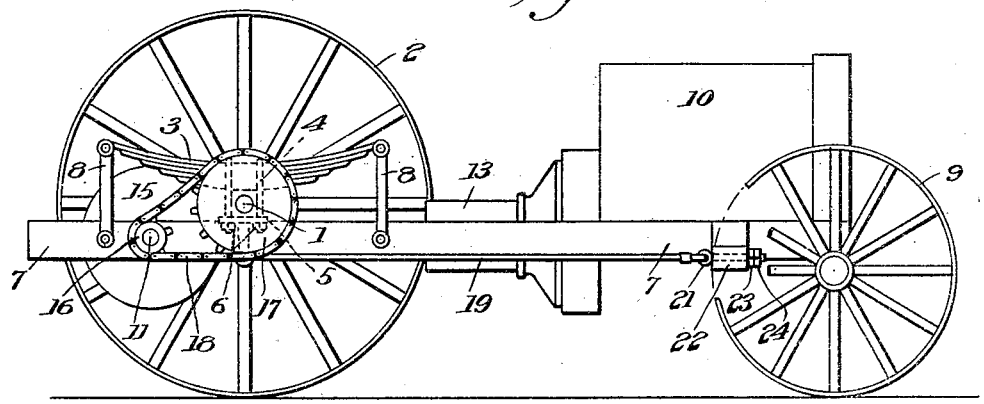
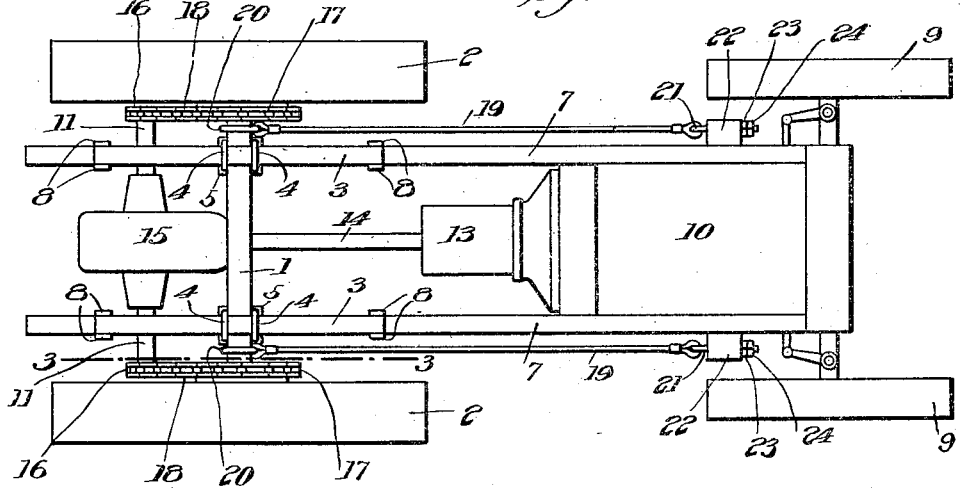
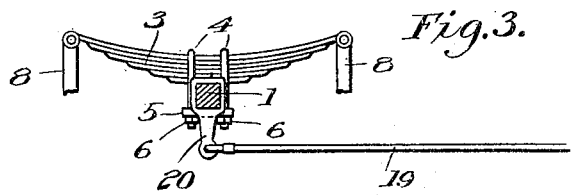
Inventor
William Pauli
By Harry C. Schroeder
Attorney

UNITED STATES PATENT OFFICE.

WILLIAM PAULI, OF OAKLAND, CALIFORNIA.

POWER-TRANSMISSION FOR TRACTORS.

1,371,930. Specification of Letters Patent. Patented Mar. 15, 1921.

Application filed March 3, 1919, Serial No. 280,425. Renewed November 8, 1920. Serial No. 422,688.

*To all whom it may concern:*

Be it known that I, WILLIAM PAULI, a citizen of the United States, residing at Oakland, in the county of Alameda and State of California, have invented certain new and useful Improvements in Power-Transmission for Tractors, of which the following is a specification.

My invention is a direct power transmission, particularly applicable to a spring-mounted tractor.

The invention is illustrated in the accompanying drawing which forms a part of this specification and the appended claims.

Referring to the drawing:

Figure 1 is a side elevation of a tractor and my power transmission applied thereto, one of the rear wheels being removed for the purpose of clear illustration.

Fig. 2 is a plan view of the tractor and power transmission shown in Fig. 1.

Fig. 3 is a sectional view on line 3—3 of Fig. 2, showing how the springs are mounted on the rear axle.

In the drawing, 1 indicates the rear axle of a tractor, the ends of which are journaled in the hubs of rear wheels 2. Semi-elliptic springs 3 are mounted on axle 1 by straps 4, the ends of said straps extending through blocks 5 engaging the under side of said axle, and nuts 6, screwing on the ends of said straps, holding said blocks against said axle. The tractor frame 7 is suspended at the rear by means of shackles 8 from the ends of springs 3. The forward end of the tractor frame is mounted on the usual front steering wheels 9. An engine 10, mounted on the forward part of the frame 7, drives differential cross shaft 11, which is suitably journaled in the frame through the medium of gearing 13, transmission shaft 14 and differential 15. Sprockets 16 and 17 are respectively secured on the ends of differential shaft 11 and on rear wheels 2, and chains 18 extend over said sprockets whereby the rear wheels are driven from the differential shaft 11 which in turn is driven by the engine as described. Cables 19 extending horizontally at the sides of frame 7 in alinement with the lower reaches of the chains 18, are connected at their rear ends by arms 20 depending from the rear axle 1 and at their forward ends to eye-bolts 21 mounted in lugs 22 on the forward end of the frame 7. Nuts 23 and 24 screw on the forward ends of eye-bolts 21, the nuts 23 engaging lugs 22 and nuts 24 engaging and locking nuts 23. The longitudinal relation of the sprockets 16 and 17 may be adjusted and fixed by the nuts 23 and 24.

The location of the differential shaft 11 on the frame 7 and the relative sizes of sprockets 16 and 17 give the lower reaches of chains 18 a horizontal direction and the sprockets 16 a direct horizontal pull on the sprockets 17, thus eliminating any possibility of the sprockets 16 climbing downwardly on said lower reaches of the chains and swinging the front end of the frame upwardly about the rear axle 1, and the front steering wheels 9 off the ground, which would prevent steering of the tractor.

The cables 19 prevent the sprockets 16 from creeping forwardly on the lower reaches of chains 18 and drawing the frame 7 forwardly under the rear axle 1 or the rear axle backwardly over the frame, thus holding the spring-mounted frame and the rear axle in a fixed forward and backward or longitudinal relation.

The horizontal alinement of the lower reaches of chains 18 and the cables 19 enables the engine to transmit its power in a horizontal longitudinal direction to the tractor, thus maintaining the frame in a horizontal position and the front wheels firmly on the ground.

Most wheel tractors that are driven by their rear wheels must have the engine transmission and enough other parts built in front of the driving wheels, so that when power is applied to the driving wheels, the leverage caused by one gear or sprocket turning another gear or sprocket to drive the tractor lifts some of the weight off the front wheels and exerts same on rear wheels, causing them to have more traction. On a heavy pull when the tractor strikes a place where the driving wheels slip, some of the weight that is exerted on the driving wheels by being leveraged or lifted off the front wheels is immediately released from the rear wheels, causing less traction just when it is most needed. Most tractor manufacturers figure a great deal on this weight to help the traction.

My invention overcomes this objection inasmuch as it maintains a uniform traction weight on the rear wheels and a uniform steering weight on the front wheels under all conditions.

My invention furthermore allows the trac tor to be set on springs without pulling on or through them and without rigid radius or torsion rods, thereby giving the tractor all advantages that any spring mounted vehicle has without taking away the effective pull in the transmission of power.

Having described my invention, I claim:

1. In a power transmission for a tractor or other vehicle, an axle, wheels on said axle, a frame spring-mounted on said axle, a differential mounted on said frame, sprockets on the differential shafts, sprockets on said wheels, chains extending over the differential shaft sprockets and the wheel sprockets, the relation of the differential shaft sprockets and the wheel sprockets being such as to give the power reach of said chains a horizontal longitudinal direction, longitudinal cables connected at one end to said axle and at the other end to said frame for holding said axle and said differential shafts in a limited longitudinal relation, and means for driving said differential.

2. In a power transmission for a tractor or other vehicle, an axle, wheels on said axle, a frame mounted on said axle, a differential mounted on said frame, sprockets on the differential shafts, sprockets on said wheels, chains extending over the differential shaft sprockets and the wheel sprockets, the relation of the differential shaft sprockets and the wheel sprockets being such as to give the power reach of said chains a horizontal longitudinal direction, longitudinal cables connected at one end to said axle and at the other end to said frame for holding said axle and said differential shafts in a limited longitudinal relation, and means for driving said differential.

3. In a power transmission for tractors, or other vehicles, a frame, a motor on said frame, drive sprockets, means for transmitting power from said motor to said drive sprockets, sprockets on the drive wheels of the vehicle, chains traversing the drive sprockets and wheel sprockets, the sprockets being arranged so that the active drive reaches of the chains extend in a horizontal longitudinal direction, and cables connected to the axle of the drive wheels and to said frame and extending in a horizontal longitudinal direction in alinement with the drive reaches of said chains.

In testimony whereof I affix my signature.

WILLIAM PAULI.